April 28, 1953      C. BLANCHET      2,636,609
DESILTING VALVE

Filed Feb. 11, 1949      4 Sheets-Sheet 1

INVENTOR.
Charles Blanchet
BY George H. Gorey
ATTORNEY

April 28, 1953 C. BLANCHET 2,636,609
DESILTING VALVE
Filed Feb. 11, 1949 4 Sheets-Sheet 2
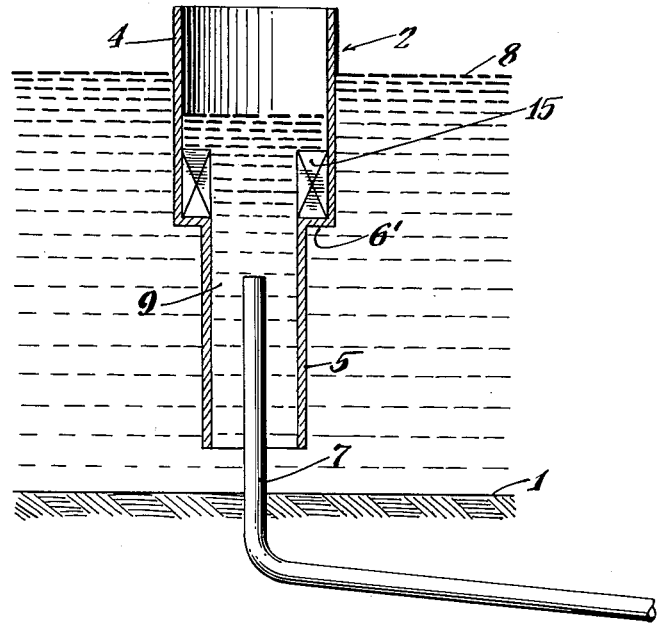
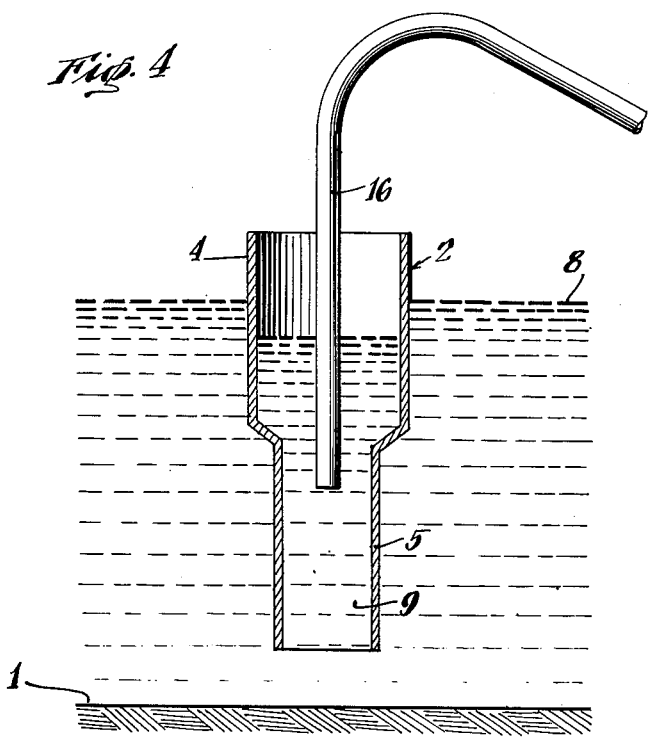
INVENTOR.
Charles Blanchet
BY George H. Casey
ATTORNEY April 28, 1953 C. BLANCHET 2,636,609
DESILTING VALVE
Filed Feb. 11, 1949 4 Sheets-Sheet 3

INVENTOR.
Charles Blanchet
BY George H. Corey
ATTORNEY

April 28, 1953 C. BLANCHET 2,636,609
DESILTING VALVE
Filed Feb. 11, 1949 4 Sheets-Sheet 4
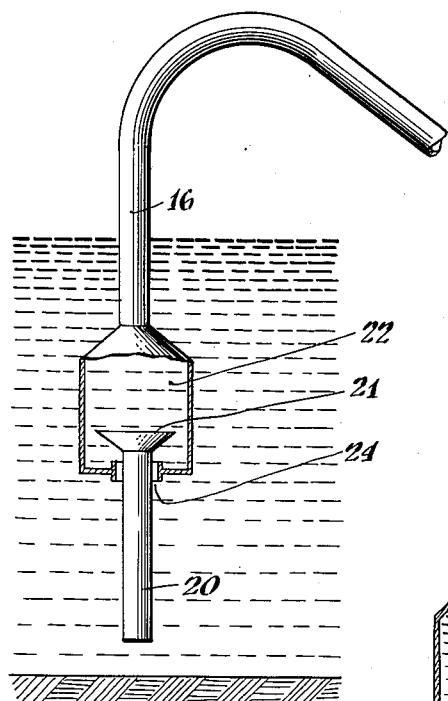
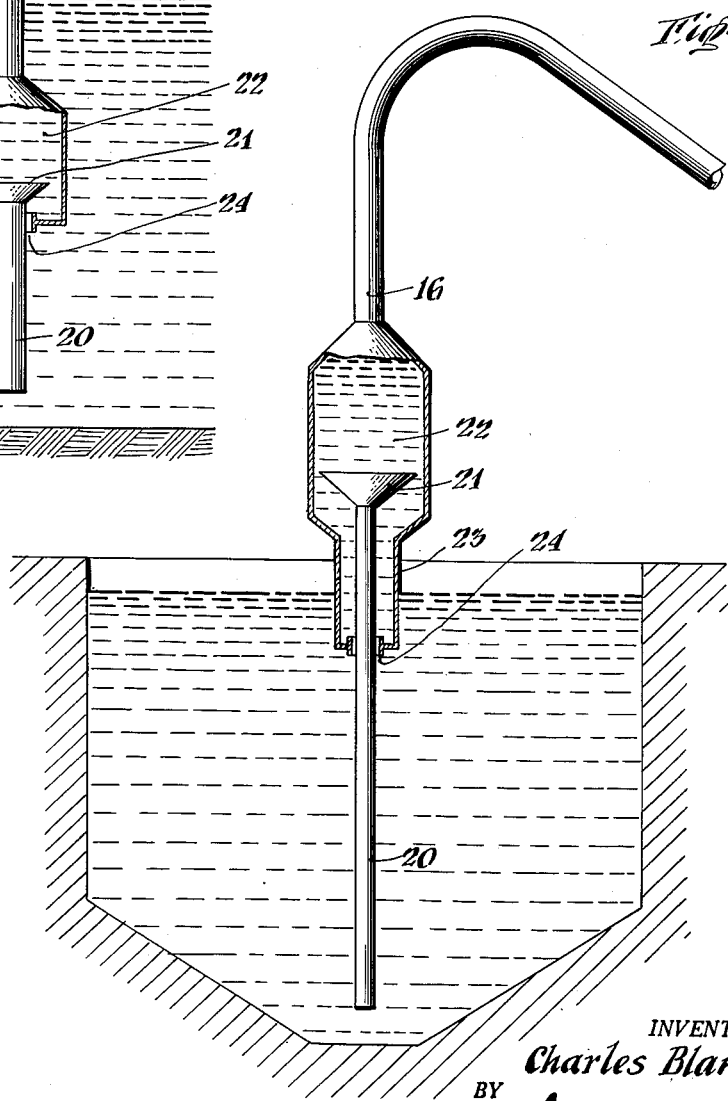
INVENTOR.
Charles Blanchet
BY George H Levey
ATTORNEY Patented Apr. 28, 1953

2,636,609

UNITED STATES PATENT OFFICE 2,636,609

DESILTING VALVE

Charles Blanchet, Grenoble, France, assignor to Etablissements Neyrpic, Grenoble, France, a corporation of France Application February 11, 1949, Serial No. 75,847
In France February 16, 1948

16 Claims. (Cl. 210—51)

The present invention relates to apparatus for evacuating sediment, earth, sand, gravel or other fine particulate material which is carried along in suspension in a flow of water or another fluid and which tends to settle out and accumulate as the flow velocity decreases, as, for example, when water is discharged from water courses into ponds, reservoirs and other hydraulic installations. More particularly, this invention concerns the provision of apparatus for effecting such evacuation which will be hereinafter referred to as a "desilting valve."

The accumulation of suspended matter in hydraulic installations gradually reduces the efficiency of such installations and necessitates relatively frequent cleaning operations which may result in an interruption in the use or effectiveness of the hydraulic installation involved. This applies especially to fine sedimentary matter which is heavier than the liquid in which it is present, such as the water intakes of hydraulic installations, desilting works and coal washers, as well as installations in which the liquid has little or no flow such as decanting basins.

It is, therefore, an object of this invention to provide a device by means of which sedimentary matter and other suspended solids may be removed from flowing or substantially still liquids.

It is a further object of the invention to provide a desilting valve which serves to establish a controlled withdrawal of portions of the liquid that are adjacent the bottom of the reservoir, settling basin or other confining channel or container and consequently more heavily charged with the solid material while leaving the liquid in the upper layers thereof toward the surface substantially undisturbed.

It is a further object of the invention to provide a desilting valve of simple construction which is automatically responsive to changes in the level of the liquid to increase or decrease the rate of flow to and through the evacuating pipe of those portions of the liquid that are more heavily charged with the sediment.

Other and further objects and advantages will be understood by those skilled in this art or will be apparent or pointed out hereinafter.

In the accompanying drawings wherein I have illustrated certain embodiments of this invention:

Fig. 3 is a view similar to that of Fig. 1, but wherein a modified form of the tubular valve member is employed.

Fig. 4 is also a view similar to that of Fig. 1 but wherein the evacuating pipe is arranged as a siphon.

Figs. 7 and 8 are diagrammatic elevations of views with a part broken away in section illustrating further modified forms of the invention in which the vertically movable tubular member is provided with an outwardly flaring funnel-shaped portion at its upper end and in which the evacuating pipe, in the form of a siphon, is provided with an enlarged chamber enclosing the upper end of the vertically movable tubular member.

The present invention is predicated upon the use of a tubular member which is vertically movable and which is partially or wholly submerged within the liquid containing the matter to be evacuated. This tubular member is provided with a portion of enlarged diameter adjacent its upper end and is operably associated with a fixed pipe which may be arranged either as a gravity actuated evacuating pipe or as a siphon. Under normally encountered working conditions wherein there is no restriction of the upward flow of the water containing the matter to be evacuated as the result of an excessive accumulation of such matter therein, the difference of the exterior and interior pressures acting on the tubular member remains approximately constant and the position of such member in the river or other body of water is determined and controlled by the quantity of sediment on the floor or bottom of such body of water. When the amount of sediment becomes large, so as to tend to jam the valve and reduce the upward flow, the tubular member automatically rises due to an increase in the pressure difference until the initial or normal upward flow is re-established, thus evacuating the sediment under what may be considered as normal or standard conditions. The sediment is discharged by the evacuating pipe at any suitable or desired remote point, as in a river, canal or other appropriate place.

Figure 1:
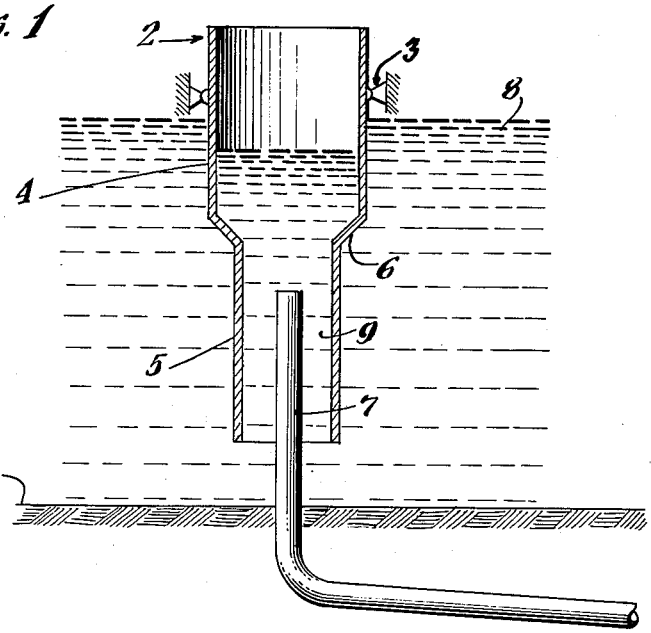
Fig. 1 is a diagrammatic elevational view of one form of my new desilting valve showing the vertically movable tubular valve member in vertical section.

Referring now to Fig. 1 of the drawings, the desilting valve is located adjacent the floor or bed of the canal, river or other confining channel for the body of water containing the matter to be evacuated. This valve includes the vertically movable tubular member 2, the movements of which may be controlled by the guide members 3 which may be of any suitable construction forming no part of the invention. As shown in Fig. 1, the tubular valve member 2 is composed of a lower cylindrical portion 5 and upper cylindrical portion 4 connected by the frusto-conical intermediate portion 6, it being particularly noted that the upper cylindrical portion 4 is of greater diameter than the lower cylindrical portion 5. The evacuating pipe 7 in this form of the invention has one end extending upward axially into and terminating within the tubular member 2. The evacuating pipe 7 leads to a suitable point of discharge and may, for example, extend beneath the floor 1 of the canal or other confining channel.

The respective diameters of the cylindrical portions 4 and 5 are so related that the weight of the tubular member 2 is normally balanced by the difference between the interior and exterior water pressures acting upon the frusto-conical connecting portion 6 when the level of the water inside the tubular member is above the said frusto-conical connecting portion 6. Thus, assuming that the tubular member 2 is initially empty and resting upon the floor of the canal or other channel, it will be immediately lifted due to the hydraulic pressure exerted on its exterior wall surfaces and which at that instant is not balanced by an opposing pressure on the interior surfaces. As soon as water has entered and has risen to a suitable height above the connecting wall portion 6 a state of balance or equilibrium will be established. This height will be determined by the loss of head set up through the evacuating pipe 7. The amount of discharge through evacuating pipe 7 and the relative vertical height of the cylindrical sleeve 2 in the body of water therefore depend upon a loss of head which is equal to the difference between the levels of the body of water 8 and the level of the body of water 9 which is present in the tubular member 2.

It will be seen that the cylindrical sleeve acts in the manner of a float as a result of its configuration and the differences in pressure exteriorly and interiorly thereof. During the time the sleeve is in a condition of equilibrium the water from the lower portions of the body thereof passes upwardly into the tubular member and then out through the evacuating pipe 7, carrying with it the sediment or other undesirable suspended matter which tends to concentrate in the lower layers of the body of water adjacent the lower end of the tubular member 2. After the sediment-laden water enters the member 2 it passes first upwardly therein and then down through the evacuating pipe 7 as a result of the head produced by the difference in the level of the water in the valve and the water at the downstream or remote end of the evacuating pipe where the sediment is discharged. It is to be understood, however, that the evacuation can be carried out by other methods such as by pumping, in which case a pump is suitably inserted in the evacuating pipe at any convenient or accessible point thereof. When the desilting valve is functioning normally, the upward flow of sediment-laden water thereinto is equal to the discharge through evacuating pipe 7. To insure such a condition the valve is positioned near the region of the body of water in which the sediment collects and may even penetrate somewhat thereinto. In this manner, the best conditions for effective operation of the valve are realized.

Figure 2:
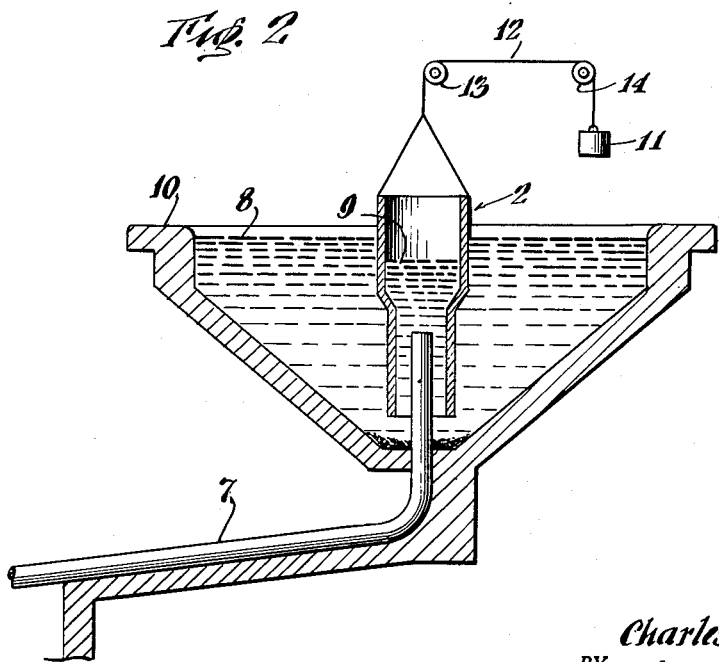
Fig. 2 is a view generally similar to Fig. 1 of a modified form of the invention as applied to a hopper-shaped sand removal device.

In the modified form of the invention illustrated in Fig. 2 the desilting valve composed of the tubular member 2 and the evacuating pipe 7 are installed within the hopper-shaped sand-removing device 10, a portion of the evacuating pipe 7 being suitably supported by an inclined extension of the device 10, as shown. In this case the tubular member 2 is counter-balanced by means of a weight 11 which is connected to the upper end of the member 2 by means of cable 12 which intermediately passes over the pulleys 13 and 14. The principles of operation are the same as explained in connection with Fig. 1, but the arrangement of Fig. 2 has the additional advantage that the weight of the valve member 2 is partly balanced by means of the counter-weight 11, and hence the buoyancy of the valve member is materially increased.

The form of desilting valve illustrated in Fig. 3 is essentially the same as that of Fig. 1 except that the tubular member 2 is provided with an annular seat or step 6' between the upper and lower cylindrical portions 5 and 4 and an annular hollow float element 15 is disposed on and secured to such seat or step in order to provide increased buoyancy in a different and simpler manner. Thus the tubular member of Fig. 3 is not provided with a frusto-conical connecting portion, but otherwise responds to the tubular member of Fig. 1, as will be apparent.

It will be noted in connection with the modifications of Figs. 1, 2 and 3 that the upper end of the tubular member 2 extends above the level of the body of water 8 and is open to the atmosphere. The lower end of the tubular member 2 normally is relatively close to but somewhat spaced from the floor or bottom of the channel but is capable of upward and downward movement in response to changing conditions as already explained anent Fig. 1. The precise position of the tubular member 2 with respect to the floor or bottom 1 and the intake end of the evacuating pipe 7 depends upon conditions at any given time with especial reference to the amount of sediment or other matter to be discharged and the loss of head established through the evacuating pipe 7. These forms of the invention are further characterized in that they insure the effective evacuation of the sediment-laden water while permitting maximum utilization of the head which is determined by the difference in the levels of the free water surface of the body of water 8 and the discharge point of the sediment. In those instances in which the discharge or dumping point of the sediment involves a relatively high water level, the arrangement of the evacuating pipe 7 can be varied to avoid low points and thereby to provide a greater assurance of sediment evacuation, although this is not significant when a pump is provided in the evacuating line.

Fig. 4 illustrates how the benefits of the present invention can be realized under conditions such as referred to just above. While the tubular member 2 is the same as that of Fig. 1, the evacuating pipe 16 is arranged as a siphon and therefore has its intake end extending downwardly into the member 2 through the upper end of such member in contrast to the evacuating pipe 7 previously described which has its intake end extending upwardly into the bottom of said member. In both cases the intake end of the evacuating pipe is located somewhat below the point of enlargement of the tubular member 2. The desilting valve of Fig. 4 has the particular advantage that the pipe 16 cannot become blocked due to the fact that sediment in the valve tends to fall either into the interior of the valve 2 or passes down the evacuating pipe to the point of disposal.

Figure 5:
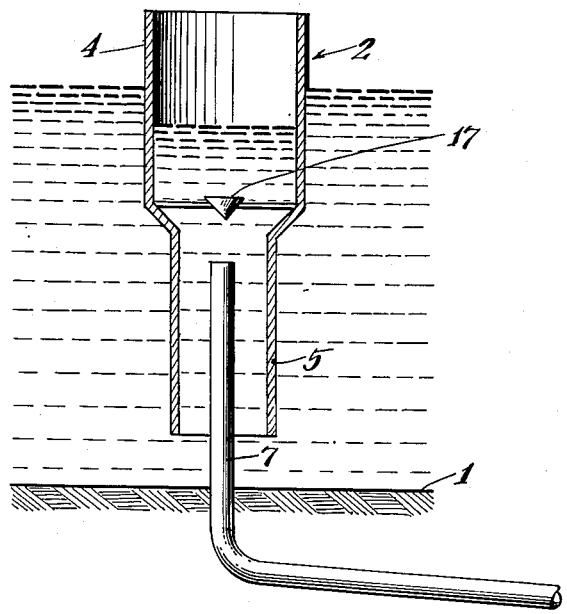
Fig. 5 is a view generally similar to Fig. 1 but illustrates a modification in which the tubular valve member is provided with means for reducing or stopping the flow of fluid to the evacuating pipe.
Figure 6:
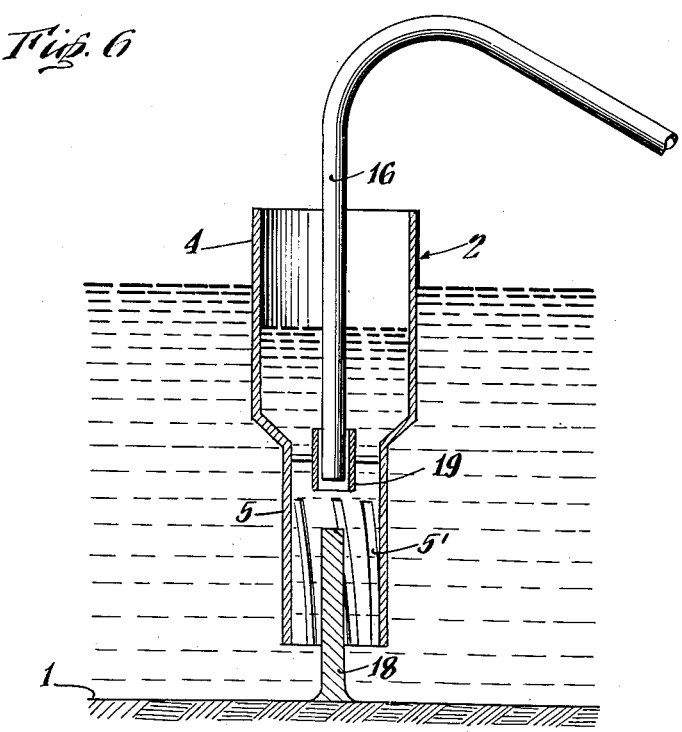
Fig. 6 is a view generally similar to Fig. 1 but illustrating a modified form of the invention in which the evacuating pipe is arranged as a siphon and the tubular member is associated with means for reducing or stopping the flow of liquid to the pipe which is independently supported.

When the amount of sediment or other matter in the water becomes reduced to a point where it is unobjectionable, I have found that it is desirable to be able to reduce the loss of water through the evacuating pipe and hence I have illustrated in Figs. 5 and 6 arrangements whereby the flow of water to the evacuating pipe can be reduced. In Fig. 5 the intake end of the evacuating pipe is located just below a special conical plug 17 which is suitably mounted within the tubular valve member 2 at the upper end of the frusto-conical connecting portion between the upper and lower cylindrical portions thereof. When, due to the decrease in the matter to be evacuated, the valve 2 descends, the plug 17 effectively cooperates with the upper end of the evacuating pipe to diminish the outward flow of water through such pipe. In Fig. 6 the same result is secured in connection with a siphon-type of evacuating pipe by providing the valve 2 with an inner tubular member 19 supported centrally of the opening therethrough and so disposed lengthwise thereof as normally to surround the intake end of the pipe 16 so that when the valve descends the tube 19 is entered and blocked by a cylindrical rod 18 having substantially the same diameter as the pipe 16 and which is suitably mounted or positioned on the floor or bottom 1 of the canal or other channel, as shown. As pointed out above, the vertical movements of tubular valve member 2 are automatic and in response to the variations in the pressure difference on the valve 2. Also, other things being equal the pressure difference will vary with the amount of sediment or the like collecting on the floor or bed of the channel in the vicinity of the intake of the valve 2. When the amount of sediment decreases, the buoyant effect upon the valve 2 decreases and the valve therefore descends. This movement is taken advantage of in the embodiments of the invention shown in Figs. 5 and 6 for the purpose of diminishing the flow of water through the evacuating pipe during those times when the amount of sediment is lessened. It will be appreciated also that the normal tendency of the cylindrical valve 2 is to descend and this tendency is offset either by the increase in the amount of sediment at the location of the valve or by the provision of means for increasing the buoyancy of the valve as referred to above in connection with Figs. 1 and 2, for example.

I have further found that the upward movement of sediment into the interior of the valve can be facilitated by imparting a gyratory movement to the tubular valve member 2. This can be accomplished by providing the interior surface of the lower narrower portion 5 of the member 2 with small vanes or the like 5' which are so disposed and directed that the upward movement of water thereagainst imparts the desired movement to the sleeve.

The invention can be realized in other ways as shown in Figs. 7 and 8 which represent examples of special applications of the present invention. In these figures a modified form of the vertically movable tubular member is employed which is designated by the numeral 20. This, like the member 2, is of generally cylindrical shape, but the upper end of the member 20 is provided with an outwardly flaring portion 21 giving to the member 20 the appearance of a funnel. The siphon-type evacuating pipe 16 is provided with an enlarged chamber 22 at its intake end and the upper funnel-shaped section 21 of the member 20 is located within such chamber 22. In Fig. 7 the enlarged chamber 22 is entirely submerged, whereas in Fig. 8 it is only partially submerged and is supplementally provided with a cylindrical extension 23. In each instance, however, the chamber 22 has a suitable opening 24 in order to allow for vertical movements of the member 20. The enlarged chamber 22 of Fig. 7 is placed directly in the flow of the water, but in Fig. 8 it is substantially above the water level in order to avoid eddies and like disturbances in the flow of water.

It is to be understood that the foregoing represent examples of embodiments by means of which the present invention may be carried into effect but that the same are intended as illustrative and not as limitative, since other and further variations and modifications may equally well be employed without departing from the principles of the invention. The invention embraces all such embodiments of the invention as come within the terms or spirit of the appended claims and wherein a floating or non-floating tubular vertically movable valve member is provided having the configurations and relative dispositions as above described. Furthermore, a desilting valve according to this invention may be placed wherever desired or needed, singly or in any necessary number and spacing in bodies of water such as rivers, canals or decanting basins, or in troughs, hoppers or the like. Finally, the sediment or other matter to be discharged can be removed either from the bottom of the cylindrical sleeve or section as by means of an evacuating pipe of the type designated by the numeral 7 of Fig. 1 or from the top of the sleeve or section by a siphon-type of evacuating pipe such as shown at 16 in Figs. 4, 6, 7 and 8.

I claim:

1. A desilting valve for hydraulic installations, comprising a tubular member open at both ends and adapted to be at least partially immersed in an upright position in a body of liquid containing sediment to be removed with the lower end of the member adjacent the bottom of said body of liquid, an evacuating pipe having its inlet end in communication with the interior of said tubular member and spaced from the lower end thereof, said pipe being effective to establish a discharge of liquid therethrough when the pressure at its outlet end is lower than the pressure at its inlet end, said discharge being effective to lower the pressure within said member, said member having a substantially greater cross-sectional area at the upper end of the immersed portion thereof than at its lower end, so that the pressure difference between the inside and outside of the member produces a buoyant force thereon, said buoyant force being effective when it exceeds the net weight of the member to lift said member, said lower pressure inside said member being effective when the member is so lifted to induce an upward flow from adjacent the bottom of the body of liquid into the member and thence through the evacuating pipe, said upward flow being effective to entrain sediment disposed adjacent said bottom.

2. A desilting valve as defined in claim 1, in which the difference in said cross-sectional areas is so related to the net weight of the tubular member that the buoyant force on the member just balances the net weight of the member when the lower end thereof is just clear of the bottom, whereby an increase in the amount of silt adjacent the lower end of said tubular member partially clogs it, thereby causing the flow of liquid through the outlet pipe to reduce the pressure in the tubular member and thereby increase the buoyant force thereon, so that the tubular member rises and admits a greater flow of liquid to carry the silt through said member and said outlet pipe.

3. A desilting valve as defined in claim 1, including a flow limiting valve at the inlet of said evacuating pipe, said flow limiting valve comprising a valve element and a cooperating seat element, one of said elements being stationary and the other said element being movable with said tubular member and cooperating with said stationary element to reduce the flow through said evacuating pipe as said member reaches its lowermost position.

4. A desilting valve as defined in claim 3, in which said evacuating pipe extends upwardly into said tubular member through the lower end thereof, the upper end of said outlet pipe forms the seat element of said flow limiting valve, and the valve element is carried by the tubular member.

5. A desilting valve as defined in claim 1, in which said body of liquid is enclosed in a container and in which said tubular member is only partly immersed, said evacuating pipe is a siphon having its inlet end extending downwardly within said tubular member, and including a flow limiting valve at the inlet of said siphon comprising a sleeve surrounding said inlet and carried by said member, and a rod fixed on the bottom of said container and having its upper end of substantially the same dimensions as the siphon inlet and aligned therewith and spaced therefrom, said sleeve being adapted to close the space between the siphon inlet and said upper rod end as said member reaches its lowermost position.

6. A desilting valve as defined in claim 1, including means for guiding the vertical movements of said tubular member.

7. A desilting valve as defined in claim 1, including a series of vanes attached to the inside of the lower end of said tubular member, so that the action of the water on said vanes tends to rotate the member.

8. A desilting valve as defined in claim 1, in which said evacuating pipe is a drain pipe extending through the lower end of said tubular member.

9. Apparatus for removing sediment from a body of liquid, comprising a tubular member open at both ends and adapted to be at least partially immersed in an upright position in said body of liquid, said member being more dense than said liquid and tending to sink therein to a position wherein its lower end is closed by engagement with the bed of said body of liquid, said member having a cross-sectional area at the upper end of the immersed portion thereof substantially greater than the cross-sectional area at its lower end so that when the pressure inside said member is less than the pressure outside said member a buoyant force is produced tending to lift said member off the bed, an evacuating pipe having its inlet end in communication with the interior of said tubular member and spaced from the lower end thereof, and means including said evacuating pipe for drawing liquid from the interior of said tubular member so as to reduce the pressure therein sufficiently to lift said member from the bed and then draw sediment-bearing liquid into the lower end thereof and thence out through said evacuating pipe.

10. Apparatus for removing sediment from a body of liquid, comprising a container for said body of liquid, a tubular member open at both ends, and adapted to be at least partially immersed in an upright position in said body of liquid, said member being more dense than said liquid and tending to sink therein to a position wherein its lower end is closed by engagement with the bottom of said container, said member having a cross-sectional area at the upper end of the immersed portion thereof substantially greater than the cross-sectional area at its lower end so that when the pressure inside said member is less than the pressure outside said member a buoyant force is produced tending to lift said member off the container bottom, means to guide said tubular member during vertical movement thereof, an evacuating pipe having its inlet end in communication with the interior of said tubular member and spaced from the lower end thereof, and means including said evacuating pipe for drawing liquid from the interior of said tubular member so as to reduce the pressure therein sufficiently to lift said member from the container bottom and draw sediment-bearing liquid into the lower end thereof and thence out through said evacuating pipe.

11. Apparatus for removing sediment from a body of liquid as defined in claim 20, in which said tubular member is only partly immersed, said evacuating pipe is a siphon having its inlet end extending downwardly within said tubular member, and including a flow limiting valve at the inlet of said siphon comprising a sleeve surrounding said inlet and carried by said member, and a rod fixed on the bottom of the container and having its upper end of substantially the same dimensions as the siphon inlet and aligned therewith and spaced therefrom, said sleeve being adapted to close the space between the siphon inlet and said upper rod end as said member reaches its lowermost position.

12. Apparatus for removing sediment from a body of liquid, comprising a tubular member open at both ends, and adapted to be at least partially immersed in an upright position in said body of liquid, said member being more dense than said liquid and tending to sink therein to a position wherein its lower end is closed by engagement with the bed of said body of liquid, said member having a cross-sectional area at the upper end of the immersed portion thereof substantially greater than the cross-sectional area at its lower end so that when the pressure inside said member is less than the pressure outside said member a buoyant force is produced tending to lift said member off the bed, an evacuating pipe having its inlet end in communication with the interior of said tubular member and spaced from the lower end thereof, said evacuating pipe and said tubular member being telescopingly related so that said pipe serves as a guide for the vertical movements of said tubular member, and means including said evacuating pipe for drawing liquid from the interior of said tubular member so as to reduce the pressure therein sufficiently to lift said member from the bed and draw sediment-bearing liquid into the lower end thereof and thence out through said evacuating pipe.

13. Apparatus for removing sediment from a body of liquid, comprising a tubular member open at both ends, and adapted to be partially immersed in an upright position in said body of liquid, said member being more dense than said liquid and tending to sink therein to a position wherein its lower end is closed by engagement with the bed of said body of liquid, said member being longer than the depth of said body of liquid, said member having a cross-sectional area at the upper end of the immersed portion thereof substantially greater than the cross-sectional area at its lower end so that when the liquid level inside said member is less than the liquid level outside said member a buoyant force is produced tending to lift said member off the bed, an evacuating pipe having its inlet end projecting into the interior of said tubular member and spaced below the outside liquid level, and means including said evacuating pipe for drawing liquid from the interior of said tubular member so as to lower the level therein sufficiently to lift said member from the bed and draw sediment-bearing liquid into the lower end thereof and thence out through said evacuating pipe.

14. A desilting valve for hydraulic installations, comprising a tubular member open at both ends and adapted to be at least partially immersed in an upright position in a body of liquid containing sediment to be removed with the lower end of the member disposed adjacent the bottom of said body liquid, a siphon having its inlet end in communication with the interior of said tubular member and spaced from the lower end thereof, said siphon being effective to establish a flow of liquid therethrough when the pressure at its outlet end is lower than the pressure at its inlet end, said flow being effective to lower the pressure within said member, said member having a substantially greater cross-sectional area at the upper end of the immersed portion thereof than at its lower end, so that the pressure difference between the inside and outside of the member produces a buoyant force thereon, said buoyant force being effective when it exceeds the net weight of the member to lift the member, said lower pressure inside said member being effective when the member is so lifted to induce an upward flow from adjacent the bottom of the body of liquid carrying sediment therefrom into the member, from which it flows through the siphon.

15. A desilting valve as defined in claim 14 in which only a portion of the tubular member is immersed, and in which the inlet end of the siphon extends downwardly into the open upper end of the tubular member.

16. A desilting valve as defined in claim 14 in which said tubular member is completely immersed, and in which the inlet end of the siphon encircles the open end of the tubular member.

CHARLES BLANCHET.

References Cited in the file of this patent

UNITED STATES PATENTS

| Number | Name | Date |
|---|---|---|
| 243,612 | Peterson | June 28, 1881 |
| 367,576 | Allen | Aug. 2, 1887 |
| 534,203 | Daly | Feb. 12, 1895 |
| 833,150 | Attenhofer | Oct. 16, 1906 |
| 982,734 | Martinelli | Jan. 24, 1911 |
| 1,059,060 | McLaughlin | Apr. 15, 1913 |
| 1,107,391 | Welch | Aug. 18, 1914 |
| 1,350,204 | Allen | Aug. 17, 1920 |
| 1,908,691 | Coe | May 16, 1933 |
| 2,140,059 | Simonsen | Dec. 13, 1938 |
| 2,199,673 | Ronning | May 7, 1940 |
| 2,342,024 | Walker | Feb. 15, 1944 |

FOREIGN PATENTS

| Number | Country | Date |
|---|---|---|
| 583,941 | France | Nov. 10, 1924 |
| 512,732 | Great Britain | Sept. 25, 1939 |